United States Patent [19]

Hasegawa et al.

[11] Patent Number: 5,500,777
[45] Date of Patent: Mar. 19, 1996

[54] MAGNETIC HEAD DRIVE WHICH USES INDEPENDENTLY CONTROLLED PIEZO-ELECTRIC ELEMENTS

[75] Inventors: Kenji Hasegawa, Kadoma; Hiroshi Yohda, Hirakata, both of Japan

[73] Assignee: Matsushita Electric Industrial Co., Ltd., Osaka, Japan

[21] Appl. No.: 243,935

[22] Filed: May 18, 1994

[30] Foreign Application Priority Data

May 19, 1993 [JP] Japan ..... 5-117354
Feb. 28, 1994 [JP] Japan ..... 6-029599

[51] Int. Cl.⁶ ..... G11B 5/592
[52] U.S. Cl. ..... 360/77.16; 360/106; 360/109; 310/317; 310/331
[58] Field of Search ..... 360/77.16, 109, 360/106, 10.2, 10.3, 77.17, 107; 310/317, 331, 332

[56] References Cited

U.S. PATENT DOCUMENTS

| | | | |
|---|---|---|---|
| 4,169,276 | 9/1979 | Rodal | 360/77.16 |
| 4,233,637 | 11/1980 | Kubota | 360/77.16 |
| 4,441,128 | 4/1984 | Ohba et al. | 310/331 |
| 4,862,029 | 8/1989 | Kasai et al. | 310/311 |
| 5,270,890 | 12/1993 | Katou et al. | 360/77.16 |
| 5,384,507 | 1/1995 | Takada et al. | 310/317 |
| 5,387,834 | 2/1995 | Suzuki | 310/317 |
| 5,402,279 | 3/1995 | Yanagawa et al. | 360/77.16 |

FOREIGN PATENT DOCUMENTS

| | | |
|---|---|---|
| 59-180221 | 12/1984 | Japan. |
| 2-173922 | 7/1990 | Japan. |
| 4-58810 | 5/1992 | Japan. |

*Primary Examiner*—Aristotelis Psitos
*Assistant Examiner*—Larry T. Cullen
*Attorney, Agent, or Firm*—Willian Brinks Hofer Gilson & Lione

[57] ABSTRACT

In a magnetic head drive for a magnetic tape recorder of a helical scan system, a pair of first and second longitudinal bimorph elements fixed to a support member is connected to a flexible bridge member and a magnetic head is mounted to the bridge member. A pair of first and second electric sources supply electric voltages independently to electrodes of the first and second bimorph elements. The voltages applied to the bimorphs are controlled against a deviation from a record track in a magnetic tape to keep a protrusion quantity of the magnetic head constant for automatic tracking. In a magnetic tape recorder wherein the upper and lower drums of a rotating head scanner are fixed and the magnetic head is rotated along an elliptical orbit, the two bimorphs are controlled not only against a deviation from a record track in a magnetic tape but also to a rotation angle of the magnetic head in order to keep a protrusion quantity of the magnetic head constant.

8 Claims, 5 Drawing Sheets

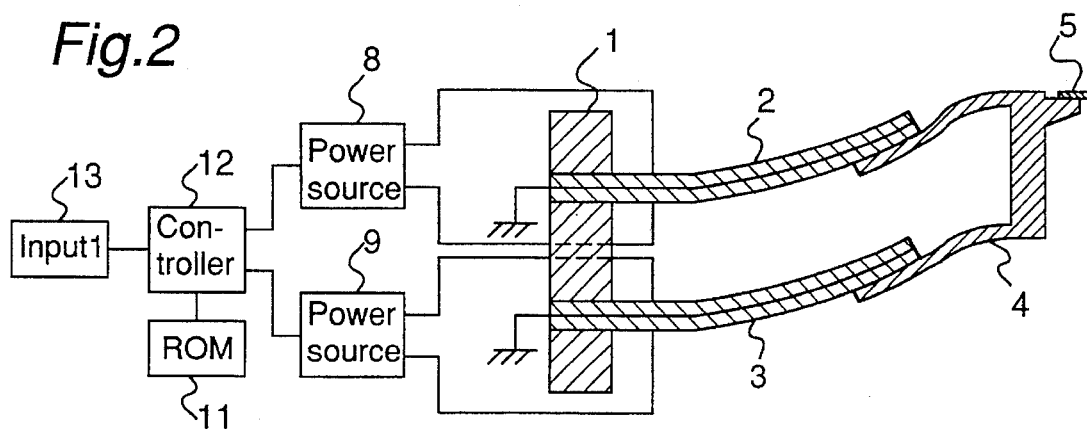
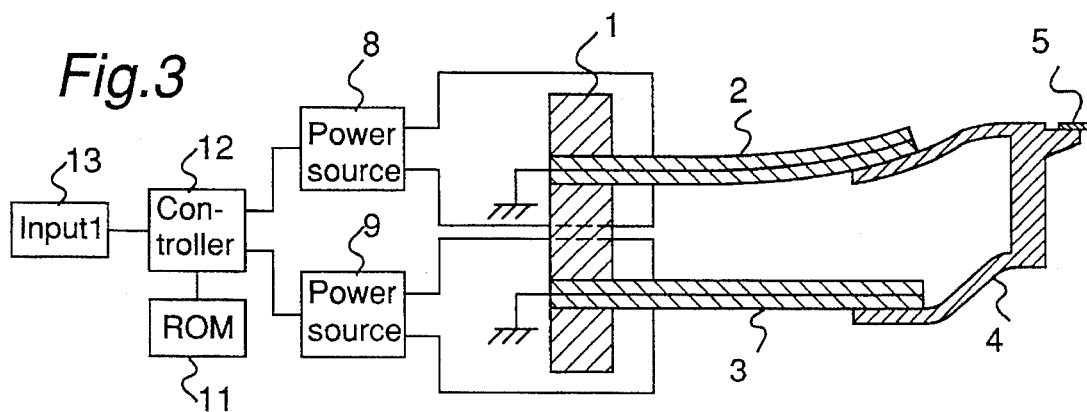
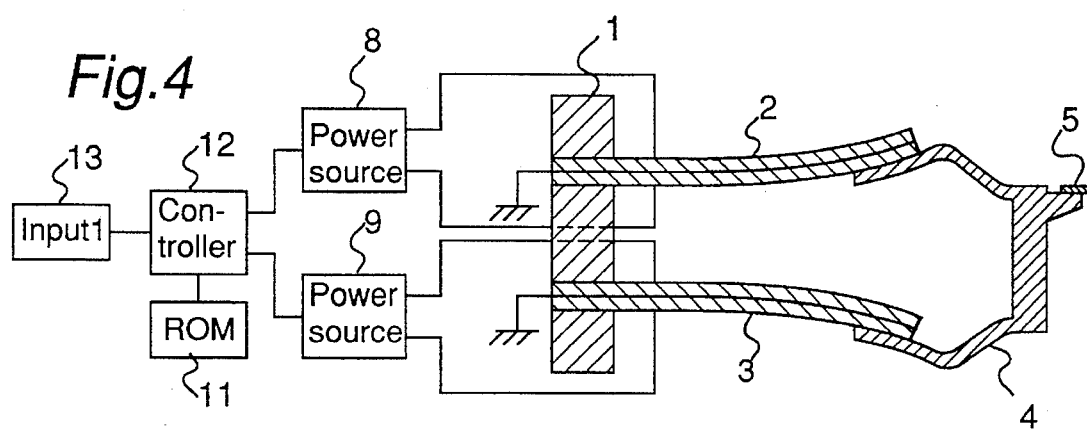

MAGNETIC HEAD DRIVE WHICH USES INDEPENDENTLY CONTROLLED PIEZO-ELECTRIC ELEMENTS

BACKGROUND OF THE INVENTION

1. Field of the Invention

The present invention relates to a magnetic head drive for a magnetic tape recorder of helical scan system.

2. Description of the Prior Art

In a video cassette recorder or the like by using helical scan, noises are generated when a magnetic tape is played back at a speed different from that on recording, for example for still reproduction or the like. The noises are generated when tracks of a reproduction head does not coincide with record tracks. In order to reduce such noises, various magnetic head drives for a magnetic head have been proposed for automatic tracking on reproduction. They are divided into two groups.

In one group, a magnetic head drive has a moving coil for magnetization mounted to a plate spring supporting a magnetic head. Therefore, it has problems that leakage magnetic flux is difficult to be prevented and that it is difficult to be produced compactly.

In another group to which the present invention relates, one or two bimorph elements each made of a pair of piezoelectric plates adhered to each other are used to drive the magnetic head so as to control its position. An applied voltage to the bimorph element expands one of the two plates while contracts the other, and the bimorph element is distorted according to the applied voltage. A drive circuit for controlling the bimorph element is disclosed for example in U.S. Pat. No. 4,169,276. It is proposed to use a pair of bimorph elements in order to make the magnetic head contact with a magnetic tape normally (for example, Japanese Utility Model laid open Publication 180,221/1984, Japanese Patent laid open Publication 173,922/1990 and Japanese Utility Model laid open Publication 58,810/1992). An end of each of the bimorph elements is fixed to a support member at one end thereof, while the other free ends thereof are connected to a bridge member with a magnetic head mounted thereto. The bridge member is made of a material such as glass fiber flexible for bending. In a drive using such a pair of bimorph elements, when a voltage is applied to the bimorph element, they are bent due to piezoelectric effect to move the magnetic head in the direction of track width. Because a replacement quantity of the magnetic head depends on the applied voltage, the applied voltage is controlled by detecting an envelope of reproduced signals.

However, such a prior art drive has a problem that a protrusion quantity above the outer surface of the drum decreases as the magnetic head is displaced. Especially, the magnetic head does not contact sufficiently with the magnetic tape in a region wherein a floating quantity of the magnetic tape is large.

SUMMARY OF THE INVENTION

An object of the present invention is to provide a magnetic head drive which can keep a magnetic head at a constant height above the outer surface of a drum.

Another object of the present invention is to provide a magnetic tape recorder which can control a magnetic head so that a protrusion quantity from an outer surface of a drum does not change when the magnetic head is replaced in the direction of tape width.

A magnetic head drive according to the present invention for a magnetic tape recorder of a helical scan system comprises a support member, a pair of first and second longitudinal bimorph elements fixed to the support member, a flexible bridge member connected to free ends of the first and second bimorph elements and a magnetic head mounted to the bridge member. A pair of first and second electric sources supplying electric voltages to electrodes of the first and second bimorph elements, independently of each other. The voltages applied to the bimorphs are controlled by a controller against a deviation from a record track in a magnetic tape to keep a protrusion quantity of the magnetic head constant so as to distort the first and second bimorph elements in the same direction, to distort them in opposite directions to each other, or to distort only one of them. In a magnetic tape recorder wherein the upper and lower drums of a rotating head scanner are fixed and the magnetic head is rotated along an elliptical orbit, the two bimorphs are controlled not only against a deviation from a record track in a magnetic tape but also to a rotation angle of the magnetic head in order to keep a protrusion quantity of the magnetic head constant.

An advantage of the present invention is that a magnetic head can always be kept in contact with a magnetic head well.

BRIEF DESCRIPTION OF THE DRAWINGS

These and other objects and features of the present invention will become clear from the following description taken in conjunction with the preferred embodiments thereof with reference to the accompanying drawings, and in which:

FIG. 2 is a schematic diagram of a situation wherein the two bimorph elements 2, 3 are displaced most in the same up direction in the drawing;

FIG. 3 is a schematic diagram of an intermediate situation wherein only one bimorph element is distorted;

FIG. 4 is a schematic diagram of a situation wherein the two bimorph elements are displaced in opposite directions;

DETAILED DESCRIPTION OF THE PREFERRED EMBODIMENTS

Figure 1:
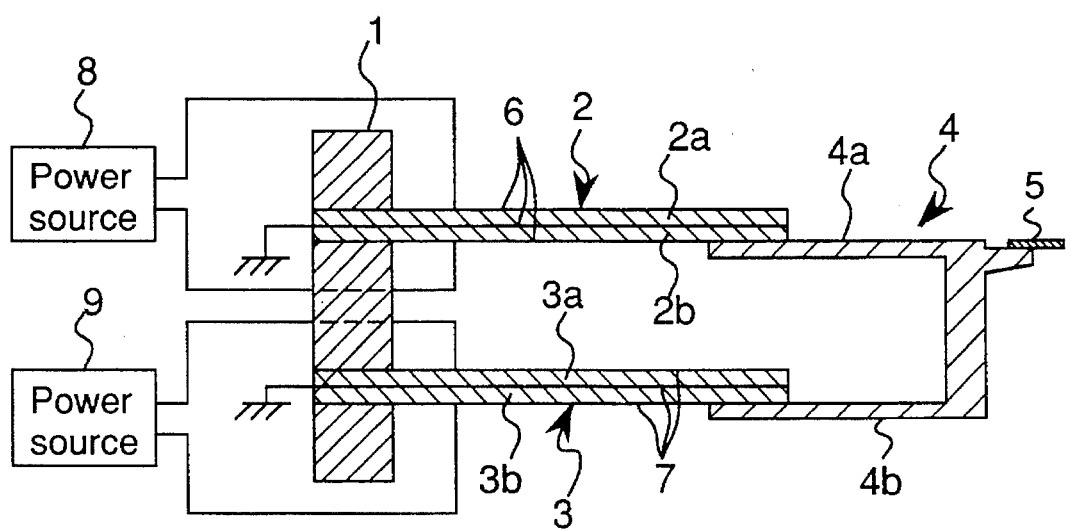
FIG. 1 is a schematic sectional view of a magnetic head drive of an embodiment of the present invention.

Referring now to the drawings, wherein like reference characters designate like or corresponding parts throughout the views, FIG. 1 shows a magnetic head drive of an embodiment of the present invention wherein a pair of bimorph elements 2, 3 is arranged in parallel generally in the longitudinal direction with a predetermined spacing. An end of each bimorph element 2, 3 is fixed with the predetermined distance between them to a support member 1 of an upper drum of a cylindrical drum 26 (FIG. 5) for a rotary head scanner of a known helical scan system in a magnetic tape recorder such as a video cassette recorder. Each bimorph element 2, 3 consists of two piezoelectric plates 2a, 2b; 3a, 3b made of a piezoelectric material such as $BaTiO_3$. The two piezoelectric plates 2a, 2b or 3a, 3b have electrodes 6, 7 provided on the two opposite surfaces thereof, and they are adhered to each other. The center electrodes between the two piezoelectric plates 2a, 2b; 3a, 3b are connected to a ground potential. Free ends of the two bimorph elements 2 and 3 are connected to a flexible bridge member 4 made of for example glass fiber. The bridge member 4 has a fork-like structure with two prongs 4a, 4b, and free ends of the prongs 4a, 4b are connected to the free ends of the two bimorph elements 2, 3. The electrodes 6 thereof are arranged so that the bimorph elements 2, 3 are flexible in a plane including them when voltages are applied to them. Each bimorph element 2, 3 can be bent due to piezoelectric effect according to a voltage applied to the electrodes 6, 7 with electric power sources 8, 9 independently of each other. A magnetic head 5 is mounted on the bridge member 4 at an end opposite to the bimorph elements 2, 3 and it can protrude by a prescribed small quantity above an outer surface of the cylindrical drum 26 (FIG. 5) to contact with a magnetic tape.

FIGS. 2, 3 and 4 illustrate three types of distortion of the magnetic head drive shown in FIG. 1. FIG. 2 shows a situation wherein the two bimorph elements 2, 3 are displaced most in the same up direction in the drawing (or in the direction of tape width) or the magnetic head 5 is placed at an uppermost position. FIG. 4 shows a situation wherein the two bimorph elements 2, 3 are displaced in opposite directions to each other and the displacement quantity of the magnetic head 5 is zero. FIG. 3 shows an intermediate situation wherein only the bimorph element 2 is distorted and the magnetic head 5 is placed at a position between the uppermost position (FIG. 2) and the origin (FIG. 4). As indicated by a dot and dashed line at the right side in FIGS. 2–4, though the magnetic head 5 is moved up and down, the position thereof is kept constant in the protruding direction above the support member 1. Though FIGS. 2–4 illustrates the displacement of the magnetic head 5 in the up direction, it will be understood that the magnetic head 5 can also be moved down similarly by reversing the directions of the distortion of the bimorph elements 2 and 3.

It is required that a protrusion quantity of the magnetic head 5 above the drum 26 is kept constant as the magnetic head 5 is displaced in the direction of tape width even if a magnetic tape is played back at a speed different from that on recording. For example, a total length from the fixed end of the bimorph elements 2 and 3 to the magnetic head 5 is 20 mm and a maximum displacement amplitude of the magnetic head 5 is 0.8 mm. Then, the total length when the magnetic head 5 is displaced to the uppermost or lowermost end is smaller by about 0.015 mm than the counterpart when the two bimorph elements 2 and 3 are not distorted. Then, it is required on reproduction that if the protrusion quantity of the magnetic head 5 from the outer surface of the rotary drum 26 is 0.040 mm, it is needed to set the magnetic head 5 so that the protrusion quantity becomes 0.055 mm which is a sum of 0.040 and 0.015 mm.

The magnetic head 5 is displaced in the direction of tape width while a protrusion quantity thereof above the outer surface of the drum 26 is kept constant and the contact angle of the magnetic head 5 with a magnetic tape is maintained to be same. Thus, distortion quantities of the two bimorph elements 2, 3 have to be controlled independently of each other, but with a predetermined correlation to keep the protrusion quantity constant by using the three situations shown in FIGS. 2–4 from the origin to the uppermost or lowermost points.

A read only memory 11 stores a table of applied voltages (distortion quantities) to the two bimorph elements 2, 3 against a replacement quantity from a record track when the magnetic head 5 is displaced in the direction of tape width. Because the two bimorph elements 2, 3 are controlled independently, the table includes applied voltages for the two bimorph elements 2, 3. The table is determined so as to keep a protrusion quantity of the magnetic head 5 above the drum surface constant. The applied voltages in the table are determined so as to distort the first and second bimorph elements 2, 3 in the same direction, to distort them in opposite directions to each other, or to distort only one of the first and second bimorph elements 2, 3, as shown in FIGS. 2–4. A controller 12 comprising a central processing unit determines the applied voltages according to an input signal 12 (or a detected envelope of reproducing signals) on deviation of the magnetic head 5 in the direction of tape width by referring the read only memory 11. If data stored in the read only memory 11 is insufficient, the controller 12 uses an interpolation to determine applied voltages.

Figure 5:
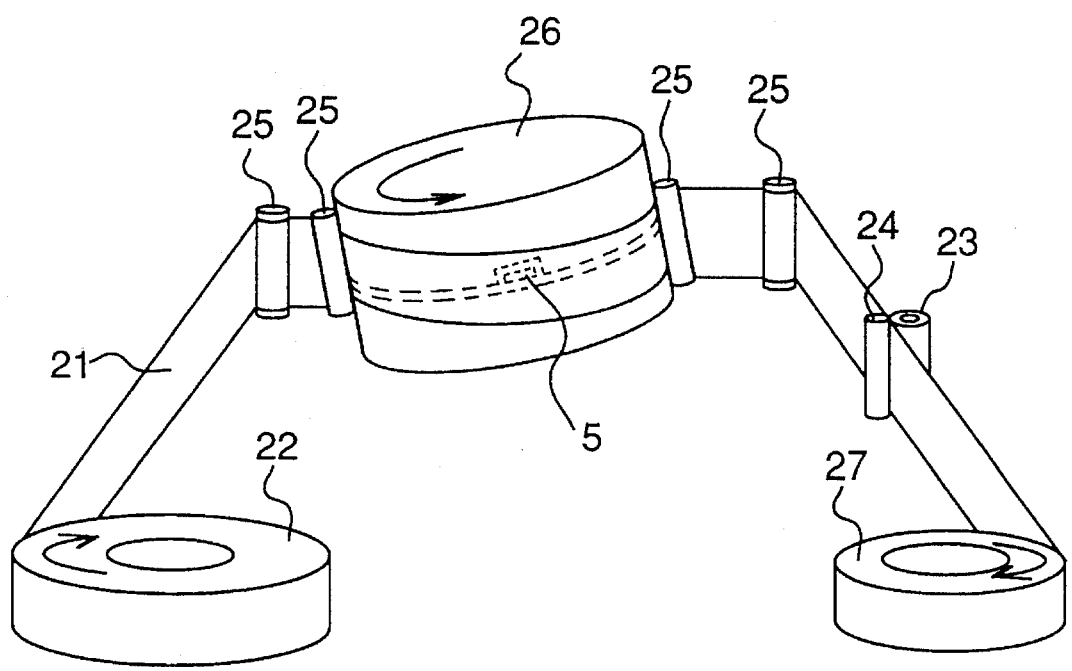
FIG. 5 is a diagram of a magnetic tape scanning system of a magnetic tape recorder of a first embodiment of the present invention.

FIG. 5 shows a schematic diagram of a magnetic tape recorder including a tape drive system. The drum 26 consists of a rotary upper drum and a fixed lower drum arranged coaxially, and the magnetic head drive having a pair of bimorph elements 2, 3 as shown in FIGS. 1–4 are mounted inside the rotary upper drum, protruding a little above the upper surface of the drum 26 through a space between the upper and lower drums. A magnetic tape 21 runs on the drum 26 to contact with the magnetic head 5. In the magnetic tape recorder, the magnetic tape 21 wound on a supply reel 22 is pulled by a pinch roller 23 and a capstan 24, and it is pressed by way of guides 25 to the drum 26. Then, it passes between the pinch roller 23 and the capstan 24 and is wound on a winding reel 27. By using the magnetic head drive, the protrusion quantity of the magnetic head 5 is kept constant when the magnetic head 5 follows a record track on reproduction.

Figure 6:
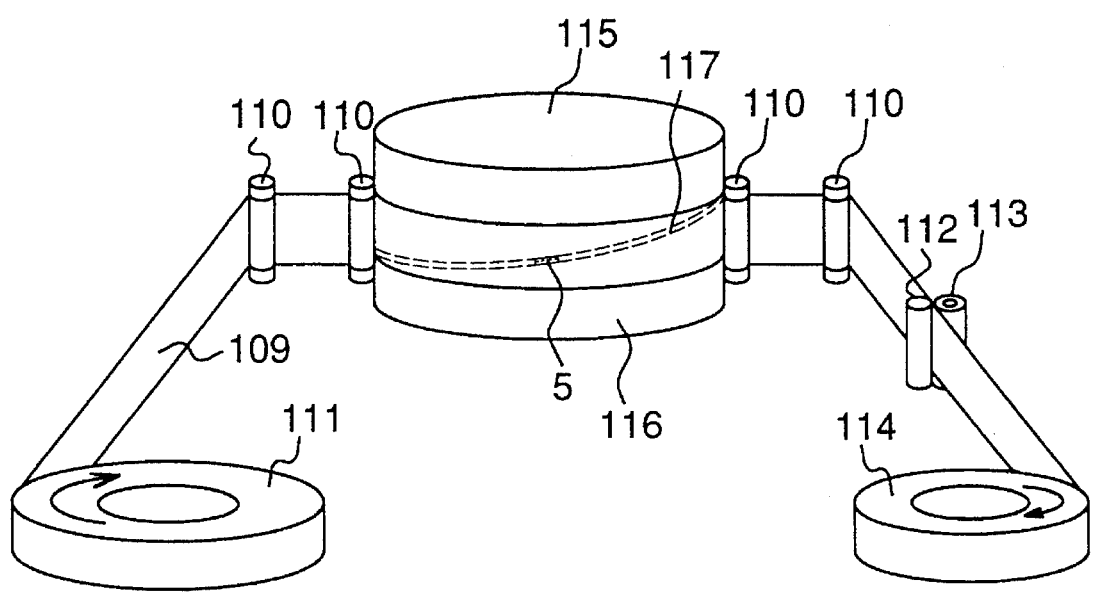
FIG. 6 is a perspective view of a drum of a magnetic recorder of a second embodiment of the present invention.

Next, FIG. 6 shows a magnetic tape recorder of a second embodiment of the invention including a tape drive system. A drum is composed of an upper drum 115 and a lower drum 116. Both drums 115 and 116 are fixed and a gap 117 is formed between them. The gap 117 between opposing edges of the drums 115, 116 is elliptical and is inclined against the central axes of the drums 115, 116. One or more magnetic heads 5 can be supported on a peripheral edge of a rotating plate provided between the drums 115, 116 and rotated fast in the gap 117 in the same direction as a magnetic tape 109. The magnetic tape 109 is pressed to the drums 115, 116 along the outer surface thereof along a horizontal direction. Each of the magnetic heads 5 is supported by a magnetic head drive including a pair of bimorph elements and a bridge member. The magnetic head drive has the same structure as that of the first embodiment shown in FIG. 1, but its driving method is different from that of the first embodiment because the magnetic head 115 will be driven obliquely against the central axes of the drums 115, 116.

As shown in FIG. 6, the magnetic tape 109 wound on a supply reel 111 is pulled with a pinch roller 113 and a capstan 112, and it is pressed by way of four guides 110 to the fixed drums 115, 116 and contacts with the magnetic head 5. Then, it passes between the pinch roller 113 and the capstan 112 and is wound on a winding reel 114. By using the magnetic head drive, the protrusion quantity of the magnetic head 5 is kept constant when the magnetic head 5 follows record tracks on reproduction.

The magnetic head 5 moves around along the gap or along an elliptical orbit between the two drums 115 and 116. It is required that the moving magnetic head 5 has to be protruded by a predetermined quantity from the outer surfaces of the drums 115, 116. However, the rotary plate supporting the magnetic head 5 is rotated along a circular orbit. Because the magnetic head 5 moves along the elliptical orbit explained above, the magnetic head drive controls to protrude the magnetic head 5 a little by a predetermined quantity from the outer surfaces of the drums 115, 116. It is to be noted that if such control is not used, the protrusion quantity is modulated along the elliptical orbit and that normal recording and reproduction cannot be carried out. For example, if the diameters of the drums 115 and 116 are 62 mm and the azimuth angle of the gap against a horizontal plane of the drums or perpendicular to the central axes thereof is 7.5°, the modulation of the protrusion quantity amounts to 0.265 mm at maximum.

By changing the degree of the distortion of a pair of bimorph elements in the magnetic head drive, the protrusion quantity can be kept constant continuously while tracking a record track automatically in the direction of tape width. That is, the magnetic head drive can play a role to keep the protrusion quantity of the magnetic head 5 constant irrespective of the rotating position (rotating angle) of the magnetic head 5.

Figure 7:
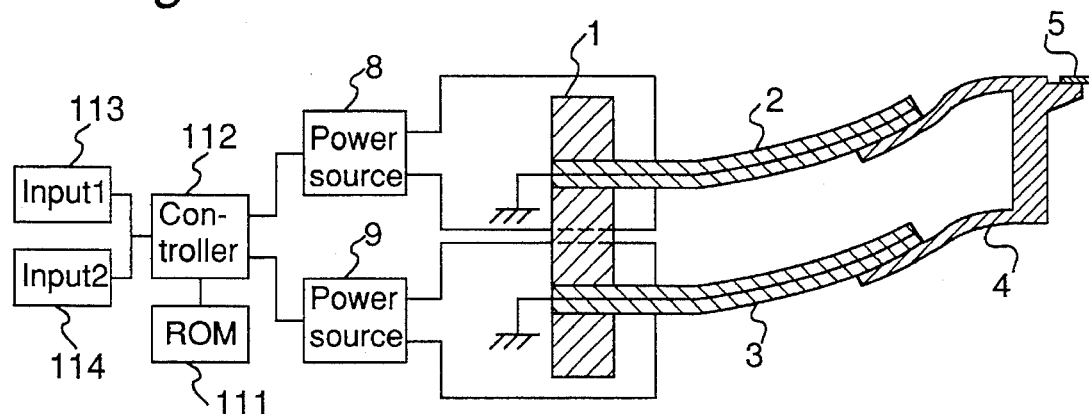
FIG. 7 is a schematic diagram of a situation wherein the two bimorph elements 2, 3 are displaced most in the same up direction in the drawing.
Figure 8:
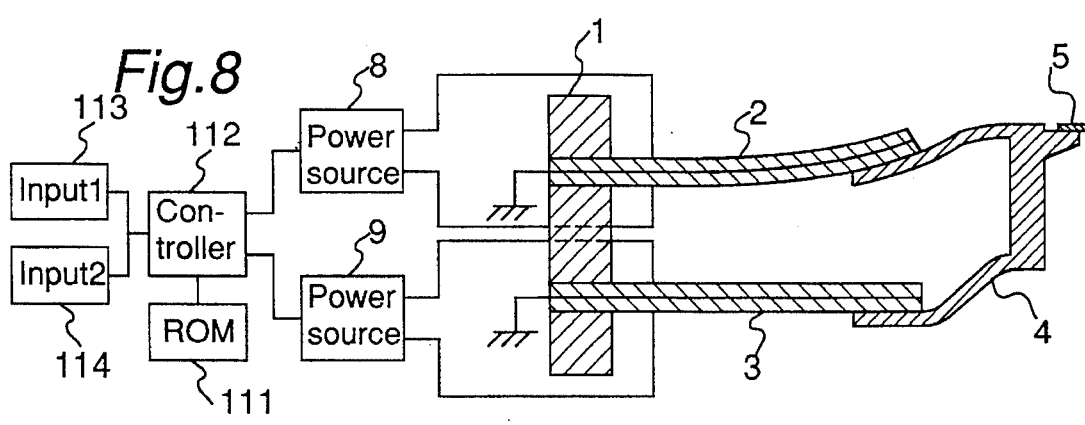
FIG. 8 is a schematic diagram of an intermediate situation wherein only one bimorph element is distorted.
Figure 9:
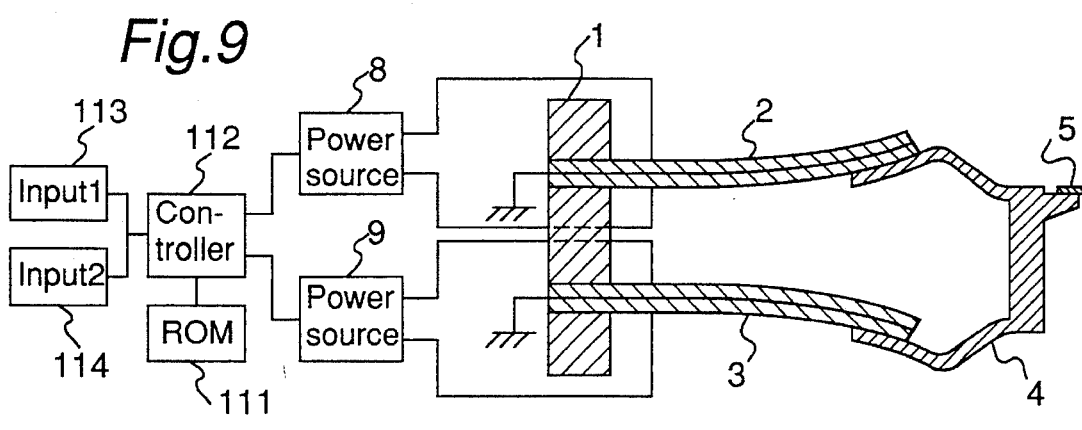
FIG. 9 is a schematic diagram of a situation wherein the two bimorph elements are displaced in opposite directions.

The tracking of the magnetic head 5 is similar to that of the first embodiment as explained above. The protrusion quantity of the magnetic head 5 itself can be controlled by distorting the two bimorph elements arranged in parallel, as shown in FIGS. 7–9 illustrating three types of distortion of the magnetic head drive shown in FIG. 1. Similarly to FIGS. 2–4, FIG. 7 shows a situation wherein the two bimorph elements 2, 3 are displaced most in the same up direction in the drawing, FIG. 9 shows a situation wherein the y are displaced in opposite directions and the displacement quantity of the magnetic head 5 is zero, and FIG. 8 shows an intermediate situation wherein only the bimorph element 2 is distorted and the magnetic head 5 is placed at a position between the uppermost position (FIG. 7) and the origin (FIG. 8).

The magnetic head drive can play a role to replace the magnetic head 5 in the direction of tape width or to track record tracks. However, the tracking of the magnetic head 5 is different from that of the first embodiment because the protrusion of the magnetic head 5 has to be kept constant irrespective of the rotating angle thereof. Then, a controller 112 comprising a central processing unit controls the magnetic head drive according to two input signals 113 and 114 on deviation of the magnetic head 5 from a record track and on a rotation position (rotation angle) thereof. The rotation position or rotation angle is derived from synchronization signals used to control the rotation of the magnetic head drive. A read only memory 111 stores a table of applied voltages (distortion quantities) to the two bimorph elements 2, 3 against a combination of a replacement quantity from a record track and a rotation angle. The table is determined so as to keep a protrusion quantity of the magnetic head 5 above the drum surface constant, and the applied voltages in the table are determined so as to distort the first and second bimorph elements 2, 3 in the same direction, to distort them in opposite directions to each other, or to distort only one of the first and second bimorph elements 2, 3, as shown in FIGS. 7–9. The controller 112 determines the applied voltages to the bimorph elements 2 and 3 according to two kinds of input signals 113 and 114 by referring the read only memory 111. If data stored in the read only memory 111 is insufficient, the controller 112 uses an interpolation to determine applied voltages. Thus, even if the magnetic head 5 is rotated elliptically, the position of the magnetic head 5 can be controlled so that the protrusion quantity of the magnetic head 5 becomes constant above the outer surfaces of the drums 115, 116.

In most of the helical scan magnetic tape recorder, a magnetic tape taken out from a tape cassette is pressed to the drum obliquely. Therefore, there are such problems that the tape tension is high or a tape has a burden on tape loading. However, the magnetic tape recorder of the present embodiment presses a magnetic tape in parallel to the drum for making contact with the magnetic head, a burden to the tape is small and a helical scan system can be made compactly.

In the embodiments explained above, data read from the read only memory 11, 111 are used to control the pair of bimorphs of the magnetic head drive. However, the controller 12, 112 may calculate a function of the applied voltages against input signals in order to control distortion quantities of the bimorphs 2, 3.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic head drive comprising:

a support member;

a pair of first and second longitudinal bimorph elements fixed to said support member with a prescribed distance between the first and second bimorph elements, which first and second bimorph elements comprising electrodes for distorting the bimorph elements according to electric voltages applied thereto;

a flexible bridge member comprising first and second portions, which first and second portions being connected to free ends of said first and second bimorph elements respectively so that said first and second bimorph elements are parallel from the fixed end to the free end when no voltages are applied to the electrodes thereof and said first second bimorph elements are distorted in a plane including said first and second bimorph elements when voltages are applied to the electrodes thereof;

a magnetic head mounted to said bridge member, which magnetic head extending in a direction opposite to said first and second bimorph elements; and a pair of first and second electric sources for independently supplying electric voltages to the electrodes of said first and second bimorph elements, respectively.

2. The magnetic head drive according to claim 1, wherein said bridge member is made of glass fiber.

3. A magnetic tape recorder, comprising:

a drum on which a magnetic tape runs;

a tape drive system for driving the magnetic tape;

a magnetic head drive comprising (a) a support member; (b) a pair of first and second longitudinal bimorph elements fixed to said support member with a prescribed distance between the first and second bimorph elements, which first and second bimorph elements comprising electrodes for distorting the bimorph elements according to electric voltages applied thereto; (c) a flexible bridge member comprising first and second portions, which first and second portions being connected to free ends of said first and second bimorph elements respectively so that said first and second bimorph elements are parallel from the fixed end to the free end when no voltages are applied to the electrodes thereof and said first and second bimorph elements are distorted in a plane including said first and second bimorph elements when voltages are applied to the electrodes thereof; (d) a magnetic head mounted to said bridge member, which magnetic head extending in a direction opposite to said first and second bimorph elements; and (e) a pair of first and second electric sources for independently supplying electric voltages to the electrodes of said first and second bimorph elements, respectively; and a controller for determining electric voltages supplied by said first and second electric sources to the electrodes of said first and second electrodes according to a deviation quantity of said magnetic head from a record track in the magnetic tape so that said first and second bimorph elements are distorted for said magnetic head to keep a record track without changing a protruding quantity of said magnetic head from the upper surface of said drum.

4. The magnetic tape recorder according to claim 3, wherein said controller determines the electric voltages so as to distort said first and second bimorph elements in the same direction, to distort said first and second bimorph elements in opposite directions to each other, and to distort only one of said first and second bimorph elements.

5. The magnetic tape recorder according to claim 3, wherein said controller comprising a memory means for storing a table of the electric voltages applied to said first and second bimorph elements against the deviation quantity and said controller determines the electric voltages by referring the memory means.

6. A magnetic tape recorder, comprising:

a cylindrical drum on which a magnetic tape runs, which drum comprising an upper drum and a lower drum connected coaxially to each other with a gap between them, the gap being formed between elliptical ends of the upper and lower drums oblique against a central axis of the cylindrical drum;

a tape drive system for driving the magnetic tape;

a magnetic head drive comprising (a) a support member; (b) a pair of first and second longitudinal bimorph elements fixed to said support member with a prescribed distance between the first and second bimorph elements, which first and second bimorph elements comprising electrodes for distorting the bimorph elements according to electric voltages applied thereto; (c) a flexible bridge member comprising first and second portions, which first and second portions being connected to free ends of said first and second bimorph elements respectively so that said first and second bimorph elements are parallel from the fixed end to the free end when no voltages are applied to the electrodes thereof and said first and second bimorph elements are distorted in a plane including said first and second bimorph elements when voltages are applied to the electrodes thereof; (d) a magnetic head mounted to said bridge member, which magnetic head extending in a direction opposite to said first and second bimorph elements; and (e) a pair of first and second electric sources for independently supplying electric voltages to the electrodes of said first and second bimorph elements, respectively, wherein said magnetic head drive is rotated in the gap in said cylindrical drum and said magnetic head is arranged to protrude above an upper surface of said cylindrical drum; and a controller for determining electric voltages supplied by said first and second electric sources to the electrodes of said first and second electrodes according to a deviation quantity of said magnetic head from a record track in the magnetic tape and to a rotation angle of said magnetic head so that said first and second bimorph elements are distorted for said magnetic head to keep a record track without changing a protruding quantity of said magnetic head from the upper surface of said cylindrical drum.

7. The magnetic tape recorder according to claim 6, wherein said controller determines the electric voltages so as to distort said first and second bimorph elements in the same direction, to distort said first and second bimorph elements in opposite directions to each other, and to distort only one of said first and second bimorph elements.

8. The magnetic tape recorder according to claim 6, wherein said controller comprising a memory means for storing a table of electric voltages applied to said first and second bimorph elements against the deviation quantity and the rotation angle and said controller determines the electric voltages by referring the memory means.

* * * * *